United States Patent [19]

Arakawa et al.

[11] 4,027,134
[45] May 31, 1977

[54] ELECTRODE FOR ELECTRICAL DISCHARGE MACHINING

[75] Inventors: Osamu Arakawa; Tadaaki Sekiguchi; Eiichi Takayanagi, all of Yokohama, Japan

[73] Assignee: Tokyo Shibaura Electric Co., Ltd., Japan

[22] Filed: Sept. 10, 1976

[21] Appl. No.: 721,956

Related U.S. Application Data

[63] Continuation of Ser. No. 521,505, Nov. 6, 1974, abandoned.

[30] Foreign Application Priority Data

Nov. 12, 1973  Japan .............................. 48-126214

[52] U.S. Cl. .............................................. 219/69 E
[51] Int. Cl.$^2$ ......................................... B23P 1/08
[58] Field of Search ................ 219/69 E, 69 R, 145

[56] References Cited

UNITED STATES PATENTS

| 2,984,731 | 5/1961 | Bradshaw et al. | 219/69 E |
| 3,198,932 | 8/1965 | Weatherly | 219/145 |
| 3,378,671 | 4/1968 | Harrison et al. | 219/145 |
| 3,413,435 | 11/1968 | Holtzclaw | 219/69 E |
| 3,585,342 | 6/1971 | Kosco | 219/69 E |
| 3,597,649 | 8/1971 | Bykhovsky et al. | 219/145 |
| 3,745,296 | 7/1973 | Shinopulos | 219/69 E |

Primary Examiner—Bruce A. Reynolds
Attorney, Agent, or Firm—Finnegan, Henderson, Farabow & Garrett

[57]  ABSTRACT

An electrode for electrical discharge machining formed of a tungsten-based alloy including Ag and/or Cu, 15 to 40% by weight, and $ZrO_2$, 0.5 to 10% by weight.

3 Claims, 1 Drawing Figure

ELECTRODE OF TUNGSTEN-BASED
ALLOY INCLUDING Ag and/or Cu, 15 to 40% BY
WEIGHT, AND $ZrO_2$, 0.5 to 10% BY WEIGHT

ELECTRODE FOR ELECTRICAL DISCHARGE MACHINING

This is a continuation of application Ser. No. 521,505, filed Nov. 6, 1974, abandoned.

BACKGROUND OF THE INVENTION

This invention relates to an electrode for electrical discharge machining which is applied to perforation or other working on a material by means of electron discharge from the electrode.

In recent years, electrical discharge machining has attracted considerable attention because it can be applied to a field in which a prior art machine tool can not be applied or to a complicated precision machining which offers difficulties when a machine tool is used. It is desired that electrical discharge machining satisfy the following requirements:

1. High machining speed

Machining speed is generally defined as follows:

$$\text{Machining speed (g/min)} = \frac{\text{machined amount (g)}}{\text{machining time (min)}}$$

Generally, the speed of electrical discharge machining is extremely low due to its mode of operation; it is as low as the grinding speed of a machine tool. Since the demand for electrical discharge machining is increasing the increase of late, it is desired to increase the machining speed.

2. Low electrode consumption

As one of factors determining electrode consumption, the following electrode consumption rate is defined herein as:

electrode consumption rate (%) =

$$\frac{\text{electrode consumption (g)}}{\text{machined amount of the material (g)}} \times 100$$

The lower the electrode consumption rate, the smaller the electrode consumption required for a fixed amount of machining of the material. In other words, the lower electrode consumption rate leads to the longer life of the electrode. The electrode is also locally deformed by electrode consumption leading, as for example, to corner wear that results in the tapering of the machined portion resulting in errors in the product shape. This also accounts for importance of lowness in the electrode consumption.

3. Accuracy of machining

The clearance should be uniform between the electrode surface and the machined surface of the material. Uniform clearance means that machining is performed accurately. This requirement is concerned partly with requirement (2) as known from the description contained herein.

4. Smoothness of the machined surface

To satisfy this condition, the electron discharge from the electrode should be stable. Unstable electron discharge not only lowers the machining speed and creates tapering, but also makes the machined surface nonuniform and coarse.

To perform electrical discharge machining satisfying the above requirements, improvements in electrode conposition play a vital role as well as improvements in machining processes.

Electrodes for electrical discharge machining which have been practically used are roughly classified into those consisting chiefly of carbon (C), those consisting chiefly of copper (Cu), and those based on tungsten (W). Electrodes consisting chiefly of C or Cu can be manufactured cheaply, but are not suitable for use in precision machining because they have an excessive electrode consumption rate.

W-Cu electrode and W-Ag electrode are known as typcial examples of W-based electrode. They advantageously have low consumption rate, but adversely provide low machining speed. It is therefore desired to obtain a W-based electrode having satisfactory properties, particularly with respect to machining speed. Recently, new electrodes are offered which are prepared by adding thoria $ThO_2$) to W-Cu or -Ag alloys. The electrode bears properties suitable for electrical discharge machining. The problem, however, is that $ThO_2$ is radioactive, and is difficult and cumbersome to handle.

An object of this invention is to provide an electrode for electrical discharge machining satisfying the above-mentioned requirements.

Another object is to provide an improved W-based electrode for electricai discharge machining.

The other object will be apparent from the following descriptions.

These and other objects of the invention are attained by the electrode which is formed of a tungsten-based alloy including 15 to 40% by weight of one memeber selected from the group consisting of Ag, Cu and a mixture thereof, and 0.5 to 10% by weight of $ZrO_2$.

FIG. 1 is a schematic representation of an EDM electrode.

DESCRIPTION OF THE PREFERRED EMBODIMENTS

Figure 1:
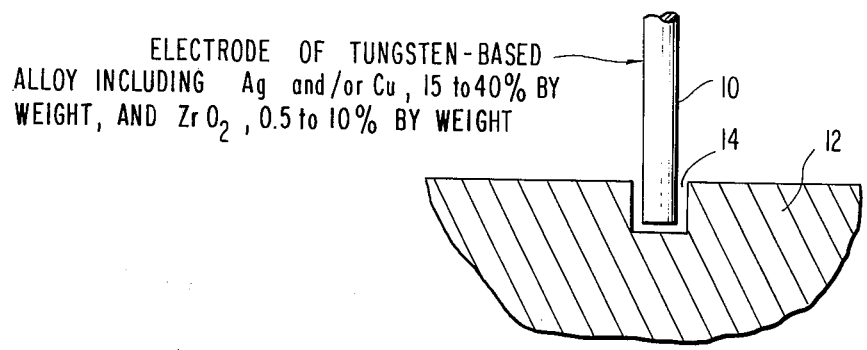

The present invention is a composition of matter having utility as an electrode for an EDM process. As depicted schematically in FIG. 1, the electrode 10 is brought into proximity with a workpiece 12. The electrical discharge from the electrode 10 vaporizes the workpiece 12 forming the machined area 14.

This invention is based on the discovery that an excellent electrode for electrical discharge machining is prepared by adding an appropriate amount of zirconia ($ZrO_2$) to W-Cu and/or -Ag alloys.

Cu, Ag or a mixture thereof serves to improve electrical conductivity, thermal conductivity and the like properties of tungsten, and is contained in an amount ranging from 15 to 40% by weight in the alloy of which the electrode according to this invention is formed. The content below 15% fails to attain satisfactory effects, while the content exceeding 40% causes too high a consumption rate of the electrode.

An appropriate amount of $ZrO_2$ ranges from 0.5 to 10% by weight. Addition of $ZrO_2$ in the specified amount serves to decrease the initial work function of tungsten, i.e. decrease in the initial discharge energy of tungsten, and to improve as a whole the thermoelectron discharge property of the electrode.

In the W-Ag and/or Cu-$ZrO_2$ alloy, $ZrO_2$ is tightly trapped in the region of tungsten having the melting point as high as 3,410° C. Thus, $ZrO_2$ always serves to lower the work function of tungsten and to stabilize the electron discharge of the electrode even under high temperatures. Therefore, the electrode of this invention is superior to a conventional electrode as to machining speed and accuracy of machining even when used under a condition of relatively small pulse width. The electrode according to this invention offers an additional advantage that electrons are discharged uniformly at a low pulse voltage. Further, $ZrO_2$ serves also to lower the consumption rate of the W-based electrode.

It has been found that further addition of thoria ($ThO_2$), yttria ($Y_2O_3$) or a mixture thereof in an amount of 0.5 to 10% by weight to the above Cu and/or Ag-$ZrO_2$-W alloy also turns out a satisfactory electrode for electrical discharge machining.

Such addition of $ThO_2$ and/or $Y_2O_3$ serves to increase the machining speed and to decrease the electrode consumption rate and corner wearing. But such effects can not be produced at the content outside the above specified range.

The acceptable contents of Ag, Cu, $ZrO_2$, $ThO_2$ and $Y_2O_3$ in the alloy forming the electrode of the invention range as defined above, but range preferably as shown by weight in Table 1 below.

Table 1

|  | Preferred (%) | Most Preferred (%) |
|---|---|---|
| Ag and/or Cu | 25 – 40 | 30 – 38 |
| $ZrO_2$ | 2 – 8 | 2 – 6 |
| $ThO_2$ and/or $Y_2O_3$ | 0.5 – 6 | 0.5 – 4 |

Since Cu and Ag are immiscible with tungsten, it is convenient to prepare the alloy by the processes of mixing W, the other additives of $ZrO_2$, $ThO_2$, $Y_2O_3$, and a small part of Cu and/or Ag, sintering the mixture by the techniques of powder metallurgy, and impregnating the remaining Cu and/or Ag into the sintered mass.

This invention can be more fully understood when taken in conjunction with the Examples which follow, though the invention should not be limited thereto. All "parts" and "percentages" are by weight.

EXAMPLE 1

Tungsten powder (100 parts), zirconia powder (5 parts) and reduced silver powder all below 325 U.S. standard mesh were put in a stainless steel pot and subjected to wet mixing using acetone. After removing acetone, paraffine was added to the mixture as a binder in the form of about 1% benzine solution and the mixture was sifted a a 100 mesh sieve. The mixed powder thus obtained was molded into predetermined shape under a pressure of about 1,000 Kg/cm$^2$. Then, the molded mass was sintered under a clean nonoxidizing atmosphere for about 1 hour at about 1,000° to 1,100° C in a continuous sintering furnace. The sintered substance was housed in a molybdenum boat in which an alumina plate had been laid. Finally a proper amount of deoxidized silver was superposed on the sintered substance and the boat was passed in an appropriate period of time through a continuous hydrogen furnace (low point of $H_2$ being −40° C) at temperatures higher than the melting point of silver (960.5° C) to effect silver infiltration into the sintered substance. Thus, the electrode was obtained which consisted of Ag (28%), $ZrO_2$ (3.4%) and W (the remainder).

Electrical discharge machining was performed using both the above electrode and 65W-35Ag electrode for comparison on a high speed steel consisting of C(0.32 to 0.42%), Si (0.80 to 1.02%), Cr(4.5 to 5.5%), Mo(1.0 to 1.50%), V(0.30 to 0.50%), Mn(below 0.5%), S(below 0.03%), P(below 0.03%), Cu(below 0.25%) and Fe(the remainder).

The machining speed in the case of 28Ag-3.4$ZrO_2$-W electrode according to this invention was 1.75 times as high as that in the case of 65W-35Ag electrode. Also, the electrode consumption in the case of the electrode of this invention was nine-tenths of that in the other case.

EXAMPLE 2

Thirty-five kinds of electrodes specimens including references were prepared as indicated in Table 2 in a manner described in Example 1 and electrical discharge machining was effected on the high speed steel mentioned in Example 1.

Table 2 shows relative values on various electrode specimens in terms of machining speed, electrode consumption and degree of corner wearing. The respective reference values are set at 100 based on the reference electrode specimen having a composition 65W-35Ag as disclosed in Example 1.

Table 2

| Sample No. | | W | Composition (%) Ag | Cu | $ZrO_2$ | $ThO_2$ | $Y_2O_3$ | machining speed | Electrode consumption | Corner wearing |
|---|---|---|---|---|---|---|---|---|---|---|
| Reference | 1 | 65 | 35 | — | — | — | — | 100 | 100 | 100 |
| " | 2 | 65 | — | 35 | — | — | — | 110 | 130 | 130 |
| " | 3 | 65 | 30 | — | 5 | — | — | 160 | 100 | 100 |
| " | 4 | 65 | — | 30 | 5 | — | — | 150 | 100 | 100 |
| " | 5 | 65 | 30 | — | — | — | 5 | 160 | 100 | 100 |
| " | 6 | 65 | — | 30 | — | — | 5 | 150 | 100 | 100 |
| " | 7 | 69.7 | 30 | — | 0.3 | — | — | 155 | 95 | 100 |
| " | 8 | 69.5 | 30 | — | 0.5 | — | — | 170 | 90 | 90 |
| " | 9 | 69.5 | — | 30 | 0.5 | — | — | 165 | 95 | 95 |
| " | 10 | 65 | 30 | — | 5 | — | — | 180 | 95 | 90 |
| " | 11 | 65 | — | 30 | 5 | — | — | 180 | 95 | 95 |
| " | 12 | 65 | 25 | — | 10 | — | — | 175 | 95 | 95 |
| Reference | 13 | 60 | 20 | — | 15 | — | — | 160 | 100 | 105 |
| " | 14 | 64.5 | 30 | — | 5 | 0.5 | — | 180 | 95 | 95 |
| " | 15 | 64.5 | 30 | — | 5 | — | 0.5 | 180 | 95 | 95 |
| " | 16 | 64 | 30 | — | 5 | 0.5 | 0.5 | 175 | 95 | 95 |
| " | 17 | 55 | 30 | — | 5 | 10 | — | 160 | 95 | 95 |
| " | 18 | 55 | 30 | — | 5 | — | 10 | 160 | 95 | 95 |
| " | 19 | 55 | 30 | — | 5 | 5 | 5 | 160 | 95 | 95 |
| Reference | 20 | 85 | 10 | — | 5 | — | — | 155 | 100 | 100 |
| " | 21 | 80 | 15 | — | 5 | — | — | 160 | 95 | 95 |
| " | 22 | 55 | 40 | — | 5 | — | — | 160 | 95 | 95 |
| Reference | 23 | 50 | 45 | — | 5 | — | — | 140 | 130 | 125 |
| " | 24 | 85 | — | 10 | 5 | — | — | 155 | 100 | 100 |
| " | 25 | 80 | — | 15 | 5 | — | — | 170 | 95 | 95 |
| " | 26 | 55 | — | 40 | 5 | — | — | 157 | 120 | 115 |
| Reference | 27 | 50 | — | 45 | 5 | — | — | 140 | 130 | 120 |
| " | 28 | 80 | 10 | 5 | 5 | — | — | 155 | 95 | 95 |

Table 2-continued

| Sample No. | | W | Composition (%) Ag | Cu | ZrO$_2$ | ThO$_2$ | Y$_2$O$_3$ | machining speed | Electrode consumption | Corner wearing |
|---|---|---|---|---|---|---|---|---|---|---|
| " | 29 | 80 | 5 | 10 | 5 | — | — | 155 | 95 | 95 |
| " | 30 | 75 | 10 | 10 | 5 | — | — | 165 | 95 | 95 |
| " | 31 | 55 | 20 | 20 | 5 | — | — | 160 | 95 | 95 |
| " | 32 | 55 | 30 | 10 | 5 | — | — | 160 | 95 | 95 |
| " | 33 | 55 | 10 | 30 | 5 | — | — | 155 | 95 | 95 |
| Reference | 34 | 85 | 5 | 5 | 5 | — | — | 155 | 100 | 105 |
| " | 35 | 50 | 20 | 25 | 5 | — | — | 140 | 130 | 125 |

The effects of ZrO$_2$ on the W-Ag and/or Cu series electrode are apparent from Table 2. Even a slight amount of ZrO$_2$ produces considerable effects. However, considering overall effects including those on machining speed, electrode consumption and corner wearing, the acceptable amount ranges from 0.5 to 10%, the maximum effect being reached at around 5% (see samples 1, 7, 8 and 10, for example). Table 2 also indicates that the acceptable amount of ThO$_2$ and/or Y$_2$O$_3$ ranges from 0.5 to 10%.

It should be noted that difficulties are encountered in preparation of the electrode if the total amount of the oxides to be added to the W-Ag and/or Cu alloy exceeds the range specified in this invention.

What we claim is:
1. An electrical discharge machining electrode formed of a tungsten-based alloy consisting essentially of 15 to 40% by weight of one member selected from silver, copper or mixtures thereof, 0.5 to 10% by weight of zirconium oxide and the balance of tungsten.
2. The electrode according to claim 1 wherein the content of said member is 25 to 40% by weight, and that of zirconium oxide is 2 to 8% by weight.
3. The electrode according to claim 1, wherein the content of said member is 30 to 38% by weight, and that of zirconium oxide is 2 to 6% by weight.

* * * * *